United States Patent Office 3,810,853
Patented May 14, 1974

3,810,853
ACID-CURING THERMOSETTING COATING COMPOSITION
Frank James, Houston, Tex., and Richard A. Jones, Terre Haute, Ind., assignors to Commercial Solvents Corporation, New York, N.Y.
No Drawing. Original application Sept. 15, 1969, Ser. No. 858,102. Divided and this application July 24, 1972, Ser. No. 274,355
Int. Cl. C09d 3/52, 3/56, 3/66
U.S. Cl. 260—21
17 Claims

ABSTRACT OF THE DISCLOSURE

A catalyzed thermosetting composition, useful for coatings and inks, consisting of one or more acid-curable resins and as a latent catalyst composition therefor an amino alkanediol hydrochloride and an alkanolamine dissolved in a lower alkanol or etheralkanol. The composition has good shelf life and is non-corrosive to containers. Preferred catalyst compositions consist of 2-amino-2-ethyl-1,3-propanediol hydrochloride and 2-amino-2-methyl-1-propanol dissolved in isobutyl alcohol or in dipropylene glycol monomethyl ether.

This is a division of co-pending application Ser. No. 858,102, filed Sept. 15, 1969.

BACKGROUND OF THE INVENTION

This invention relates to a thermosetting composition useful for coatings and inks. In a particular aspect, it relates to a catalyzed composition having good storage characteristics and non-corrosive to containers.

The use of delayed curing, or latent, catalysts for acid-curing thermosetting resins has long been known. For example, Schroy, in U.S. Pat. 2,326,727 disclosed delayed curing thermosetting resins has long been known. For application to textiles. His catalysts were tertiary amines or tertiary alkanolamines neutralized with organic or inorganic acids to a pH of 6–8. Upon heating to 140–150° C., the catalyst released the acid portion of the salt causing the resin to cure rapidly. Primary alkanolamines were not useful because the salts lacked the delayed action characteristics of the tertiary amines and the resin cured rapidly at relatively low temperatures. However, Schroy disclosed that small proportions of monoethanolamine could be substituted for an equivalent amount of triethanolamine to speed up the curing action of the latter.

Foster et al., working with paper laminates of thermosetting aminoplast resins also taught, in U.S. Pat. 3,444,190, latent curing catalysts consisting of tertiary alkanolamine salts of organic and inorganic acids prepared by adding the acid to an aqueous solution of the amine to bring the pH below 8.

The protective coatings industry has long used baking enamels based on resins having available hydroxy groups and acid-curing thermosetting resins, such as melamine-formaldehyde and urea-formaldehyde resins, which react with the hydroxy groups at baking temperature. Although the reaction occurs slowly without the addition of an acid catalyst, the reaction is much faster in the presence of one, e.g. p-toluene sulfonic acid. This type of protective coating (hereinafter referred to as "coating") is prepared by dissolving the resins in a suitable solvent, then adding the pigment and any other desirable additives. Immediately before use, the acid catalyst is added and the coating is applied to an article by spraying, brushing, dipping, etc., then heated to from 250° F. to 350° F. for a period of time sufficient to complete the polymerization reaction. Similar formulations are used for thermosetting inks.

Addition of the catalyst immediately before use has been relatively successful but problems have arisen from time to time because the addition step is not under the control of the manufacturer of the coating and sometimes is improperly performed. It would be preferable to incorporate the catalyst in the enamel at the time of manufacture, but this has previously been unsuccessful because the polymerization reaction proceeded gradually at room temperature, and the preparation did not have a satisfactory shelf life. Furthermore the acid catalyst corroded the metal containers causing leakage and other problems. Accordingly a need has existed for a catalyst which can be incorporated in the thermosetting composition at the time of manufacture, yet be free from the problems of polymerization during transportation and storage and corrosion of the container.

SUMMARY OF THE INVENTION

It is an object of this invention to provide an improved acid-curing, thermosetting composition useful for coatings and inks resins.

Another object of this invention is to provide a catalyzed, thermosetting coating having good storage characteristics and non-corrosive to containers.

Other objects of this invention will be apparent to those skilled in the art from the disclosure herein.

The improved composition of the present invention consists essentially of one or more acid-curing resins, a resin containing available hydroxy groups reactable with the acid-curing resin, and a latent catalyst composition. These components are dispersed in a suitable solvent system along with the pigment and any other desirable adjuncts known in the art. The latent catalyst composition consists of the hydrochloride salt of an amino alkanediol corresponding to Formula I

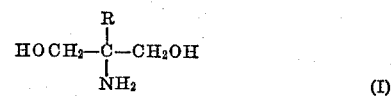

(I)

where R is methyl or ethyl, and an alkanolamine corresponding to Formula II

(II)

where $R^1$ is hydrogen or alkyl of 1 or 2 carbon atoms, and $R^2$ is hydrogen, methyl or ethyl in a mole ratio of about 1.5–2.0 of the amino alkanediol per mole of alkanolamine, dissolved in a lower alkanol or ether-alkanol and having a pH of about 7.5 to 8.0. A process is provided for the preparation of the preferred latent catalyst composition which forms a part of the present invention.

DETAILED DISCUSSION

The acid-curing thermosetting compositions catalyzable by the latent catalyst composition of the present invention are known in the art. The present invention provides an improvement over the previous compositions in that the catalyst is incorporated therein at the time of manufacture and surprisingly the resulting product can be packaged, shipped and stored without the likelihood of gelling, i.e. polymerization, and without corrosion of the container as resulted from previously-used catalysts. Typical compositions have shown a package stability of 6 months or more.

Typically, the composition of the present invention includes a non-volatile vehicle consisting of one or more acid-curing thermosetting resins and a resin having available hydroxy groups reactable with, and in a proportion by weight of about 3–4 parts to one of, the acid-curing resin. The resins are dispersed in a solvent mixture generally consisting of a mixture of one or more aliphatic alcohols, e.g. butyl alcohol, an aliphatic hydrocarbon (e.g. "varnish-makers and paint naphtha") and an aromatic hydrocarbon, e.g. xylene. Pigments and other additives are added as desired. Compositions corresponding to the foregoing are known in the art and may be used in the practice of the present invention by the addition of the latent catalyst. Many variations are known and it is not intended that the invention be limited to any particular composition. The invention is broadly applicable to any coating or ink based on the resins recited herein. Additionally the composition preferably contains a minimum total butanol content—either a substantially pure isomer or mixture thereof—of 20% by weight, or more preferably, 25%. Many of the resins suitable for the practice of the present invention are supplied in solution in butanol.

The latent catalyst composition of the present invention can be prepared by any suitable procedure, many of which will be apparent to those skilled in the art. For example, the amino alkanediol hydrochloride can be prepared as a dry salt, then dissolved in a lower alkanol, e.g. methanol, or ether-alkanol and amino alkanol added thereto in a mole ratio of about 0.56–0.58 of alkanolamine per mole of alkanediol. This amount is the approximate equivalent of the amount which, in an aqueous system, would provide a pH of about 7.5–8.0. The amount of alkanol is selected to provide a substantially homogeneous solution. The amount will vary according to the components, generally more being required with increasing molecular weight of the solid. A preferred catalyst composition is one containing from about 17–22% by weight of amino alkanediol hydrochloride and alkanolamine. Such a concentration cannot be achieved by the foregoing procedure however, particularly with the use of the preferred solvents such as isobutyl alcohol, n-butanol and the ether-alkanols.

Accordingly the preferred catalyst compositions are prepared by the following method which forms a part of the present invention. This method is to dissolve an amino alkanediol represented by Formula I set forth above, or mixture thereof, in a lower aliphatic alkanol having from 1 to 4 carbon atoms or in an ether-alkanol in a reaction vessel, preferably closed, equipped with an agitation means and a cooling means. Aqueous hydrochloric acid solution (36–38% concentration) or, preferably, anhydrous hydrogen chloride is gradually added through the inlet means until the pH is preferably, but not necessarily, within the range of 4.1–4.9, and a pH of 4.5 is particularly preferred. When anhydrous hydrogen chloride is employed, it is usually added by weight in an equi-molar amount equivalent to the amino alkanediol. However the pH can be monitored by periodically withdrawing samples, adding sufficient water to provide ionization, then obtaining a pH reading. The reaction is exothermic and the cooling means is employed to maintain a temperature below 35° C., preferably below 30° C., to avoid deleterious development of color. As the pH approaches 4.5 the rate of addition of the hydrochloric acid is slowed and, at about 4.5, the solution is held under continuous agitation until a constant pH reading is obtained, during which time the hydrogen chloride vapors above the surface of the solution will be completely absorbed. An alkanolamine corresponding to Formula II is then introduced through the inlet means in a quantity sufficient to provide a pH within about 7.5–8.0 or, alternatively, in a ratio of about 0.56–0.58 mole per mole of amino alkanediol.

The alkanolamine is liquid at ordinary temperatures and can be added without dilution, or, if desired, it may be dissolved in a lower alcohol and added as a solution. The amount of HCl will vary slightly with the equivalent weights of the amino alkanediol and the water content, if any, will vary slightly with the HCl added.

The foregoing method of preparation is easily controlled and the composition, which has a solids content of about 19 to about 21%, and a water content of from zero to about 1–2% gives a consistent rate of cure. Yet another method is dissolve the amino alkanediol and the alkanolamine in a mole ratio of about 1.5–2:1 in the solvent, i.e. a lower aliphatic alkanol or an ether-alkanol in a weight ratio of from about 50–80 parts of solvent per part of the amino alkanediol and add thereto hydrochloric acid solution (36–38%) or anhydrous hydrogen chloride in a stoichiometric amount equivalent to the amount of amino alkanediol present, i.e. in about a 1:1 mole ratio.

The catalyst composition which forms a part of the present invention can be mixed with the acid-curing thermosetting composition, i.e. the coating or ink, shortly before use in accordance with the prior art. However, to obtain the particular benefits of the invention, the catalyst composition is mixed with the coating or ink prior to packaging. The amount used may be selected according to the anticipated rate of cure desired and the temperature intended to be employed. The higher the catalyst concentration and/or the higher the temperature, the faster the rate of cure will be. Generally the catalyst composition, which is about 20% solids, is used in an amount sufficient to provide from 2–20% by weight of the catalyst solution, prepared as hereinbefore described, based on the weight of the total non-volatile vehicle in the acid-curing composition, equivalent to 0.4–4.0% by weight of the catalyst solids. For most resin combinations, however, from 3–7% of the solution equivalent to about 0.6–1.4% by weight, based on the weight of the non-volatile vehicle, will be most commonly employed, and about 5% by weight of solution, equivalent to about 1% by weight of solids, is generally preferred. The term, non-volatile vehicle as used herein denotes the total resin components, i.e. the acid-curing resin or resins, and the resins having available hydroxy groups reactable with the aforesaid acid-curing resins.

The term "acid-cure" as used herein is commonly understood by those skilled in the art to mean that the polymerization proceeds to completion. The term "curing time" is used herein to indicate the time required to obtain a satisfactory hardness of the coating. The term "acid-curing thermosetting resin" includes those resins which may be cured only under acid conditions and also those which may be cured under either acid or alkaline conditions. Such resins include those obtained by reacting an aldehyde, e.g. formaldehyde, acetaldehyde, benzaldehyde, etc., with one or more of the following: urea, thiourea, the reaction products obtained by heating and decomposing dicyandiamide, melamine, other aminotriazines, phenol, other phenols such as the alkyl phenols, etc. Mixed resins, e.g. urea-melamine-formaldehyde resins, urea-thiourea-formaldehyde resins, etc. may be prepared by reacting the aldehyde with each of the other reactants separately or the aldehyde may be reacted with a mixture of other reactants. Mixed resins containing from about 20%–60% melamine-formaldehyde resin and the remainder urea-formaldehyde resin are especially useful.

The foregoing acid-curing thermosetting resins are used in conjunction with resins having available hydroxy groups reactable with the acid-curing resins. Cross-linking occurs between these two types of resins during the heating step. Resins having available hydroxy groups include alkyd resins, polyvinyl alcohol and copolymers thereof, polyurethanes, and polyesters such as polyacrylates. These resins are used in the same proportions with the thermosetting resins as previously known in the art. Generally the proportions are in the range of 2–4 to one of acid-curing resin, by weight.

The amino alaknediols suitable for the practice of this invention include, but are not limited to, 2-amino-2-methyl-1,3-propanediol and preferably 2-amino-2-ethyl-1,3-propanediol because it generally gives a faster cure and is more compatible with most resins than the methyl homolog. Other amino alkanediols can also be used and they are regarded as obvious equivalents of the preferred compounds. Mixtures of amino alkanediols are also suitable for the practice of this invention. Products of good quality are preferred to avoid color development during the baking step.

The alkanolamines suitable for the compositions of the present invention include, but are not limited to, monoethanolamine, 2-amino-2-methyl-1-propanol, 2-amino-1-butanol and the N,N-dimethyl derivatives of these compounds, as well as mixtures thereof. Other primary and tertiary alkanolamines can also be used and are regarded as obvious equivalents of the preferred alkanolamines. The preferred alkanolamine is 2-amino-2-methyl-1-propanol. Products of good quality are preferred to avoid color development during the baking step. The term alkanolamine as used herein is intended to mean monoamino, monohydroxy and substituted alkanes. The amino substituent can also be substituted with alkyl, e.g. methyl, groups.

The solvents suitable for preparing the catalyst combination of the present invention include ether-alkanols and lower alkanols having from 1 to 4 carbon atoms, e.g. methanol, ethanol, isopropyl alcohol, n-propanol, n-butanol, isobutyl alcohol and secondary butyl alcohol. When ethanol is used, either the 95% or anhydrous material is suitable, but anhydrous is preferred. When isopropyl alcohol is used, either the 99% or the anhydrous material is suitable. Of these lower aliphatic alcohols, isobutyl alcohol is preferred.

Suitable ether-alkanols correspond to the formula $R^3-O-(CH_2)_x CH_2OH$ where $R^3$ is an alkyl group of from 1 to 4 carbon atoms or the group

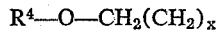

$$R^4-O-CH_2(CH_2)_x$$

where $R^4$ is methyl or ethyl and where $x$ is an integer of 1 or 2. Such ether-alkanols include the glycol ethers, i.e. the methyl, ethyl, propyl and butyl mono-ethers of ethylene and propylene glycols, and the methyl and ethyl ethers of diethylene glycol and dipropylene glycol or mixtures thereof. These ether-alkanols are particularly useful when the acid-curing composition is intended for use as an ink, and dipropylene glycol monomethyl ether is particularly preferred.

The amount of solvent used may vary somewhat depending on the particular solvent and the components used. Generally an amount of solvent is selected to provide a homogeneous solution of the amino alkanediol hydrochloride and the alkanolamine. If a phase separation occurs during the preparation of the catalyst composition, additional solvent can be added to provide a homogeneous solution. The optimum amounts can be readily determined by those skilled in the art, but generally from 3–5 parts by weight of solvent per part of total solids; i.e. the combined amino alkanediol, aminoalkanol and hydrogen chloride, anhydrous basis, is sufficient, and a ratio of 4:1 is preferred. When the amount of solvent differs significantly from a ratio of 4:1, then the amount of catalyst solution added to the coating must be adjusted to provide a suitable concentration.

The composition also contains some water from the hydrochloric acid solution when the solution is used. Generally the volume usually involved is tolerable but preferably the amount of water present is such that it does not separate after the catalyst has been incorporated in the baking enamel. When water is undesirable, anhydrous hydrogen chloride should be used for preparing the catalyst.

EXAMPLE 1

2-amino-2-ethyl-1,3-propanediol, 85 g. (about 0.7 mole), having a neutralization equivalent of 121.6, was delivered to a closed reaction vessel equipped with an agitation means, a thermometer, a pH monitoring means, a cooling means, and an inlet means. There was added 567.5 g. of isobutyl alcohol and the mixture was agitated until the alkanolamine had completely dissolved. The cooling means was adjusted to maintain a temperature of 30° C. or below. Concentrated hydrochloric acid (36–38% commercial grade) was gradually added with agitation until a pH of 4.5 was obtained. About 26 g. of HCl, anhydrous basis (70 g. of solution) was added. The agitation was continued for about an hour during which time hydrogen chloride vapors above the surface of the liquid were absorbed and the pH reading was constant. The cooling means was adjusted as required to maintain a temperature of below about 30° C. There was then added 35 g. (about 0.4 mole) of 2-amino-2-methyl-1-propanol resulting in a pH within 7.5–8.0. The solution thereby obtained was colorless and had a specific gravity of 0.875 at 25/25° C. The solids content was about 19% by weight and water content was 5.8%.

The catalyst was then used in a conventional baking enamel. A pigment grind was prepared according to the following recipe:

| | G. |
|---|---|
| Titanium dioxide | 250 |
| Short oil baking-type alkyd resin | 80 |
| Mineral spirits | 40 |
| n-Butanol | 40 |

The above pigment mixture was ground in a mill until the pigment was completely dispersed. The alkyd resin used was Duramac 2483, a short oil baking-type alkyd made from tall oil fatty acids and manufactured by McWhorter Chemicals-Company, Maywood, Ill.

The pigment mixture was then used to prepare a baking enamel by dispersing in a mixture prepared with the following recipe:

| | G. |
|---|---|
| Short oil baking-type alkyd resin | 370 |
| Melamine-formaldehyde resin | 50 |
| Butylated urea-formaldehyde resin | 90 |
| Mineral spirits | 25 |
| n-Butanol | 31 |

The melamine-formaldehyde resin used was Cymel 248–8 obtained from American Cyanamid Company, New York, N.Y. and the butylated urea-formaldehyde resin was Beetle resin XB 1032, also manufactured by American Cyanamid Company. The weights given for the above resins include the solvents in which the resins are dissolved as marketed. To the above mixture was added 15.6 g. of the catalyst composition, or 3.0 g. dry basis, to provide a concentration of about 5.2% based on total non-volatile vehicle. This baking enamel with pre-packaged catalyst was determined to have suitable shelf life and the metal container was free from corrosion.

The enamel prepared above was applied to metal articles. One article was baked at 250° F. and satisfactory hardness was achieved in 15 minutes. A second coated article was baked at 300° F. and in 10 minutes had achieved satisfactory hardness. An article coated with an enamel similar to the foregoing except containing neither catalyst nor melamine resin required 30 minutes baking time at 350° F.

EXAMPLE 2

The experiment of Example 1 was repeated except that 7% catalyst was added to the coating composition. At 250° F., a satisfactory cure was obtained in 10 minutes and at 300° F. only 5 minutes was required. When the above experiment was repeated at 5% catalyst and 250° F. baking temperature, a curing time of 15 minutes was required. When the urea-formaldehyde resin was baked without a catalyst present, it required 30 minutes curing time at 250° F. and 15 minutes curing time at 300° F.

EXAMPLE 3

The experiment of Example 1 is repeated except that 2-amino-2-methyl - 1,3 - propanediol is substituted for 2-amino-2-ethyl - 1,3 - propanediol and isopropyl alcohol is substituted for isobutyl alcohol. The resulting catalyst composition is incorporated in an enamel based on acid-curing resins. The packaged enamel has a satisfactory shelf life, does not corrode the container and when applied to an article and heated, it cures rapidly.

EXAMPLE 4

The experiment of Example 1 is repeated except that 2-amino-1-butanol is substituted for 2-amino-2-methyl-1-propanol and ethanol is substituted for isobutyl alcohol. The resulting catalyst, when added to a baking enamel based on an acid-curing resin, provides a composition having good shelf life, is not corrosive to metal containers, and cures rapidly at elevated temperatures.

EXAMPLE 5

The experiment of Example 1 is repeated except that monoethanolamine is substituted for 2-amino-2-methyl-1-propanol and methanol is substituted for isobutyl alcohol. The resulting catalyst, when added to a baking enamel based on an acid-curing resin, provides a composition having good shelf life, is not corrosive to metal containers, and cures rapidly at elevated temperatures.

EXAMPLE 6

The experiment of Example 1 is repeated except that N,N-dimethyl-2-amino-2-methyl-1-propanol is substituted for 2-amino-2-methyl-1-propanol and n-butanol alcohol is substituted for isobutyl alcohol. The resulting catalyst, when added to a baking enamel based on an acid-curing resin, provides a composition having good shelf life, is not corrosive to metal containers, and cures rapidly at elevated temperatures.

EXAMPLE 7

The experiment of Example 1 is repeated except that N,N-dimethyl-2-amino-1-butanol is substituted for 2-amino-2-methyl-1-propanol and sec.-butanol is substituted for isobutyl alcohol. The resulting catalyst, when added to a baking enamel based on an acid-curing resin, provides a composition having good shelf life, is not corrosive to metal containers, and cures rapidly at elevated temperatures.

EXAMPLE 8

The experiment of Example 1 is repeated except that N,N-dimethyl-monoethanolamine is substituted for 2-amino-2-methyl-1-propanol. The resulting catalyst, when added to a baking enamel based on an acid-curing resin, provides a composition having good shelf life, is not corrosive to metal containers, and cures rapidly at elevated temperatures.

EXAMPLES 9–14

The experiment of Example 1 was repeated using several different melamine and urea resins. The compositions coresponded to the formulas tabulated below. The weights given for the ingredients include solvents in which the resins are dispersed as marketed. The catalyst level, or concentration, varied from 3–5% by weight of solution, equivalent to 0.58–0.96% by weight of solids based on the weight of non-volatile vehicle.

| | Example No. | | | | | |
|---|---|---|---|---|---|---|
| | 9 | 10 | 11 | 12 | 13 | 14 |
| Ingredients, lbs.: | | | | | | |
| Pigment | j 250 | k 25 | l 250 | j 250 | j 250 | m 200 |
| Alkyd resin a | 450 | 450 | 450 | 450 | 450 | 450 |
| Melamine resin b | 50 | 55 | h 55 | h 120 | | 50 |
| Urea resin c | 90 | g 90 | i 90 | | 120 | 90 |
| Butanol | 50 | 50 | 50 | 50 | 50 | 50 |
| Naphtha d | 53 | 58 | 53 | 63 | 63 | 53 |
| Xylene | 26 | 62 | 32 | 28 | 38 | 36 |
| Catalyst | 14.7 | 9 | 14.7 | 14.7 | 8.5 | 14.7 |
| Viscosity, sec.e | 27 | 23 | 28 | 22 | 26 | 25 |
| Density, lbs./gal | 9.84 | 8.0 | 9.95 | 9.76 | 9.79 | 9.44 |
| Total solids, percent wt | 55.6 | 39.6 | 55.3 | 54.8 | 54.6 | 52.65 |
| Non-volatile vehicle: | | | | | | |
| Alkyd, percent wt | 75.6 | 75 | 75 | 79 | 79 | 75.6 |
| Melamine, percent wt | 9.3 | 10 | 10 | 21 | | 9.3 |
| Urea, percent wt | 15.1 | 15 | 15 | | 21 | 15.1 |
| Catalyst level, percent wt.f | 5.0 | 3.0 | 4.9 | 5.2 | 3 | 5 |
| Baking time, at— | | | | | | |
| 250° F., min | 12 | 15 | 10 | 10 | 15 | 12 |
| 350° F., min | 2 | 2 | 2 | 2 | 2 | 2 | a Duramac-2483, a high viscosity, short oil baking alkyd made from tall oil fatty acids, 50% solids in xylol and having an acid number of 4; manufactured by McWhorter Chemicals Co., Maybrook Square, Maywood, Ill.
b Cymel melamine-formaldehyde resin 248-8, 55% by wt. in 1:1 butanol-xylene solvent; manufactured by American Cyanamid Co., New York, N.Y.
c Plaskon butylated urea-formaldehyde resin 3353, 50% solids by wt, in 3:2 butanol-xylene solvent; manufactured by Cargill, Inc., Minneapolis Minn.
d Varnish-makers and paint naphtha.
e Ford cup No. 4.
f Solution prepared according to Example 1; percentage based on total non-volatile vehicle.
g Uformite F-200E, butylated urea-formaldehyde resin, 50% solids by wt. in butanol; manufactured by Rohm and Haas Co., Philadelphia, Pa.
h Uformite MM-55 melamine-formaldehyde coating resin, 50% solids in butanol; manufactured by Rohm and Haas Co., Philadelphia, Pa.
i Beetle XB-1032 butylated urea-formaldehyde coating resin, 50% solids in isobutyl alcohol; manufactured by American Cyanamid Co., New York, N.Y.
j Titanium dioxide.
k Aluminum paste, MO-588 marketed by Alcan Sales, Pittsburgh Pa. 15219.
l Chrome yellow, HY-Cap Y-469, manufactured by E. I. du Pont de Nemours, Inc., Wilmington, Del.
m Molybdate orange, Saftex Ming Orange Dark 2522-03, marketed by the Harshaw Chemical Co., Cleveland, Ohio 44106.

EXAMPLES 15–18

The formulations tabulated below are additional examples of different types of reactable reins having available hydroxy groups reactable with the acid-curing thermosetting resins. The catalyst was prepared according to claim 1 and varied from 7.4–20% by weight of the solution, equivalent to 1.4–3% by weight of solids based on the weight of non-volatile vehicle.

The coating of Example 15 was notable for its high abrasion resistance and that of Example 16 was notable for its excellent hardness, flexibility and corrosion resistance.

The coating of Example 17 was suitable as a primer for wood or composition board.

The coating of Example 18 is an aqueous system. The ingredients were dispersed in butoxy ethylene glycol 35 lb.; water, 125 lb.; aqua ammonia (28%), to pH 8.6, 13 lb.; Dow-Corning DC-11 silicone anti-foam agent, 3 lb.

|  | Example No. | | | |
| --- | --- | --- | --- | --- |
|  | 15 | 16 | 17 | 18 |
| Ingredients, lbs.: | | | | |
| Pigment | j 250 | j 295 | t 378 | 144 |
| Urethane n | 378 | | | |
| Urea resin i | 258 | | 81 | |
| Acrylic resin o | | 450 | | |
| Melamine | | k 120 | | r 96 |
| Alkyd | | | p 298 | s 96 |
| Vinyl q | | | 65 | |
| Butanol | 62 | 50 | 86 | |
| Xylene | 96 | 61 | | |
| Ethoxyethyl acetate | | | 26 | |
| 1-Nitropropane | | | 43 | |
| Acetone | | | 59 | |
| Butyl acetate | | | 59 | |
| Catalyst f | 7.4 | 14.3 | 13 | 20 |
| Density, lbs./gal | 10.17 | 10.16 | 10.82 | 11.06 |
| Total solids, percent wt | 51.11 | 57 | 54.71 | 67.28 |
| Baking schedule, min./° F | 20/325 | 15/300 | 30/140 | 2/450 |
|  |  |  | 2/300 | 1/500 | n Heliol 204-2 thermosetting urethane resin, 70% solids in ethoxyethyl acetate, manufactured by Wilmington Chemical Corp., Wilmington, Del. 19899.
o Acryloid AT-56, esters of acryl and methacrylic acid, hydroxyl functional type thermosetting acrylic resin, 50% solids in 90:10 xylene-butanol solvent, manufactured by Rohm and Haas Co., Philadelphia, Pa.
p Duramac 2482 alkyd resin, a pure short oil alkyd, free from rosin or copolymers; manufactured by McWhorter Chemicals Co., Maybrook Square, Maywood, Ill.
q Polyvinyl chloride alcohol-acetate terpolymer, Bakelite VAGH, manufactured by Union Carbide Corp., New York, N.Y.
r Cymel 350 melamine resin, 98% manufactured by American Cyanamid Co., New York, N.Y.
s Aquamac-1065 water-soluble oxazoline alkyd resin, 65% in aqueous isobutyl alcohol; manufactured by McWhorter Chemicals Co., Maybrook Square, Maywood, Ill.
t Titanium dioxide, 216 lbs.; barytes, 108 lbs.; talc, 54 lbs.

EXAMPLE 19

The experiment of Example 1 was repeated in all essential details except that 611 g. dipropylene glycol monomethyl ether (Dowanol DPG manufactured by Dow Chemical Co.) was substituted as the solvent for isobutyl alcohol and anhydrous hydrogen chloride, commercial grade from a cylinder, was substituted for the aqueous solution. The additional amount of solvent was to compensate for the approximately 44 g. of water introduced by the hydrochloric acid solution in Example 1. A thermosetting, acid-curing ink prepared therefrom showed good storage characteristics and cured rapidly at elevated temperatures.

EXAMPLE 20

The experiment of Example 19 is repeated except that 1-methoxy-2-ethanol is substituted for dipropylene glycol monomethyl ether. It is used in the preparation of a thermosetting ink.

EXAMPLE 21

The experiment of Example 19 is repeated except that 1-ethoxy-2-ethanol is substituted for dipropylene glycol monomethyl ether. It is used in the preparation of a thermosetting ink.

EXAMPLE 22

The experiment of Example 19 is repeated except that 1-propoxy-2-ethanol is substituted for dipropylene glycol monomethyl ether. It is used in the preparation of a thermosetting ink.

EXAMPLE 23

The experiment of Example 19 is repeated except that 1-butoxy-2-ethanol is substituted for dipropylene glycol monomethyl ether. It is used in the preparation of a thermosetting ink.

EXAMPLE 24

The experiment of Example 19 is repeated except that 1-methoxy-3-propanol is substituted for dipropylene glycol monomethyl ether. It is used in the preparation of a thermosetting ink.

EXAMPLE 25

The experiment of Example 19 is repeated except that 1-ethoxy-3-propanol is substituted for dipropylene glycol monomethyl ether. It is used in the preparation of a thermosetting ink.

EXAMPLE 26

The experiment of Example 19 is repeated except that dipropylene glycol monoethyl ether is substituted for dipropylene glycol monomethyl ether. It is used in the preparation of a thermosetting ink.

EXAMPLE 27

The experiment of Example 19 is repeated except that diethylene glycol monomethyl ether is substituted for dipropylene glycol monomethyl ether. It is used in the preparation of a thermosetting ink.

EXAMPLE 28

The experiment of Example 19 is repeated except that diethylene glycol monoethyl ether is substituted for dipropylene glycol monomethyl ether. It is used in the preparation of a thermosetting ink.

EXAMPLE 29

The experiment of Example 1 is repeated using about 670 parts by weight of isobutyl alcohol per 100 parts of amino alkanediol and using 37% aqueous hydrochloric acid solution, 82.5 parts containing water, about 50 parts by weight.

EXAMPLE 30

The experiment of Example 1 is repeated except that about 720 parts by weight of isobutyl alcohol is employed and the hydrogen chloride is anhydrous.

We claim:

1. An acid-curing thermosetting composition having good storage characteristics and being non-corrosive to steel containers consisting essentially of (a) an acid-curing, thermosetting resin selected from the group consisting of aldehyde-ureas, aldehyde-aminotriazines, aldehyde-phenols and mixtures thereof, (b) a resin selected from the group consisting of polyvinyl alcohol and copolymers thereof, polyurethane, polyacrylates and other polyester resins having available hydroxy groups reactable with said acid-curing resin in a ratio of about 2–4 to one of said acid-curing resin, by weight, and (c) from 2–20% by weight of a latent catalyst composition consisting of from about 17–22% by weight of an amino-alkanediol hydrochloride and an alkanolamine in a mole ratio of about 1.5–2.0:1 respectively dissolved in a lower alkanol having from 1 to 4 carbon atoms or in an ether-alkanol said aminoalkanediol corresponding to the formula

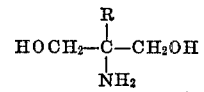

where R is methyl or ethyl, said alkanolamine corresponding to the formula

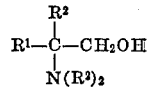

wherein $R^1$ and $R^2$ are hydrogen, methyl or ethyl.

2. The composition of claim 1 wherein said amino alkanediol is 2-amino-2-methyl-1,3-propanediol or 2-amino-2-ethyl-1,3-propanediol or a mixture thereof.

3. The composition of claim 1 wherein said alkanolamine is selected from the group consisting of 2-amino-2-methyl-1-propanol, 2-amino-1-butanol, monoethanolamine and the N,N-dimethyl derivatives thereof and mixtures thereof.

4. The composition of claim 1 wherein said catalyst solution is present in an amount of about 3–7% by weight.

5. The composition of claim 1 wherein said catalyst solution is present in an amount of about 5% by weight.

6. The composition of claim 1 wherein said catalyst solution contains from 19–21% by weight of aminoalkanediol hydrochloride and alkanolamine.

7. The composition of claim 1 wherein said thermosetting resin is a urea-formaldehyde resin.

8. The composition of claim 1 wherein said thermosetting resin is a phenol-formaldehyde resin.

9. The composition of claim 1 wherein said thermosetting resin is an aminotriazine-formaldehyde resin.

10. The composition of claim 1 wherein said resin having available hydroxy groups is an alkyd resin.

11. The composition of claim 1 wherein said resin having available hydroxy groups is a polyvinyl alcohol resin.

12. The composition of claim 1 wherein said resin having available hydroxy groups is a copolymer of polyvinyl alcohol.

13. The composition of claim 1 wherein said resin having available hydroxy groups is a polyurethane resin.

14. The composition of claim 1 wherein said resin having available hydroxy groups is a polyester resin.

15. The composition of claim 14 wherein said polyester resin is a polyacrylate resin.

16. In a composition based on an acid-curing thermosetting resin or mixtures thereof and a resin having available hydroxy groups reactable with said acid-curing resin as the non-volatile vehicle, said composition having good storage characteristics and being non-corrosive to steel containers, the improvement consisting essentially of using 2–20% by weight of a catalyst composition for curing said acid-curing resin consisting of from about 17–22% by weight of an aminoalkanediol hydrochloride and an alkanolamine in a mole ratio of about 1.5–2.0:1, respectively dissolved in aqueous-lower alkanol having from 1 to 4 carbon atoms and having a pH of from 7.5 to 8.0, said amino alkanediol corresponding to the formula

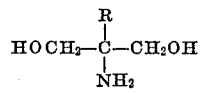

where R is methyl or ethyl, said alkanolamine corresponding to the formula

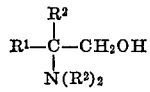

wherein $R^1$ and $R^2$ are hydrogen, methyl or ethyl.

17. The composition of claim 16 wherein said catalyst composition is present in an amount of from about 0.4 to 4% by weight of solids based on the weight of said non-volatile vehicle.

References Cited

UNITED STATES PATENTS

| | | | |
|---|---|---|---|
| 2,466,744 | 4/1949 | Scott | 260—67.6 |
| 2,467,160 | 4/1949 | Scott | 260—67.6 |
| 2,795,513 | 6/1957 | Rossin | 117—11 |
| 2,804,441 | 8/1957 | Nickerson | 260—29.4 |
| 3,152,095 | 10/1964 | Tropp et al. | 260—21 |
| 3,444,190 | 5/1969 | Foster et al. | 260—501.19 |
| 3,451,955 | 6/1969 | Koral et al. | 260—21 |
| 3,502,557 | 3/1970 | Yurcheshen et al. | 204—181 |
| 3,547,846 | 12/1970 | Coulter | 260—21 |

MAURICE J. WELSH, Primary Examiner

R. W. GRIFFIN, Assistant Examiner

U.S. Cl. X.R.

117—132 BF, 161 K, 161 L; 252—429; 260—20, 22 CQ, 33.6 UB, 33.6 UA, 842, 844, 850, 856, 849

PO-1050
(5/69)

UNITED STATES PATENT OFFICE
CERTIFICATE OF CORRECTION

Patent No. 3,810,853             Dated May 14, 1974

Inventor(s) Frank James and Richard A. Jones

It is certified that error appears in the above-identified patent and that said Letters Patent are hereby corrected as shown below:

Column 1, line 38 should read --curing catalysts for acid-curing thermosetting resins for--
Column 4, line 11, following the word "is" insert --to--
Column 5, line 3, "alaknediols" should be --alkanediols--
Column 6, line 43, "Chemicals-Company" should be --Chemical Company--
Column 8, line 59, "reins" should be --resins--
Column 9, line 14, in the table, "Catalyst f" should be --Catalyst--

Signed and sealed this 5th day of November 1974.

(SEAL)
Attest:

McCOY M. GIBSON JR.
Attesting Officer

C. MARSHALL DANN
Commissioner of Patents